Figure 1:
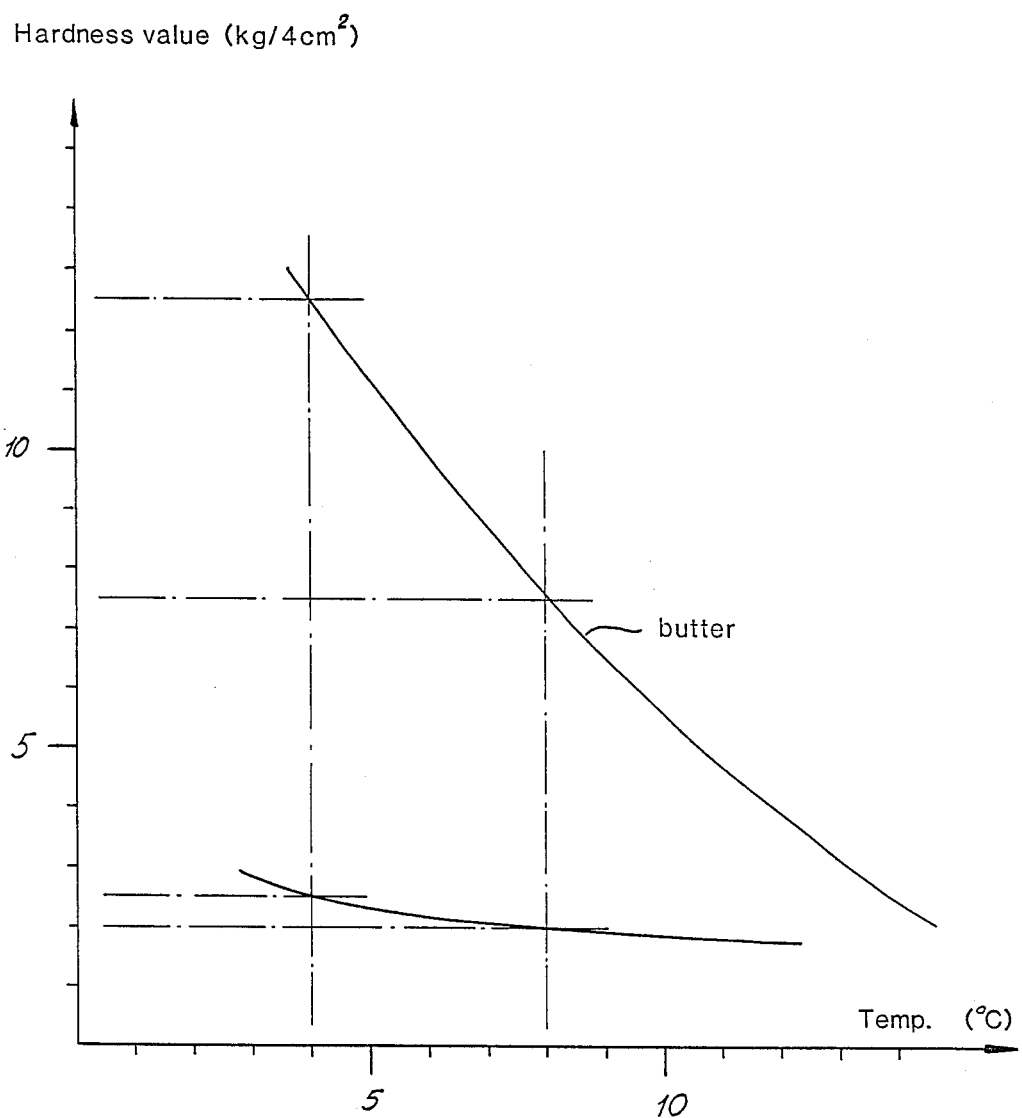

United States Patent [19]

Johansson et al.

[11] Patent Number: 4,758,446

[45] Date of Patent: Jul. 19, 1988

[54] PROCESS FOR THE MANUFACTURE OF A DAIRY SPREAD WHICH IS SPREADABLE AT REFRIGERATION TEMPERATURE

[75] Inventors: Sture Johansson, Malmo; Jan-Ake Larsson, Gotene; Kurt Wallgren, Goteborg, all of Sweden

[73] Assignee: Arla Ekonomisk Forening & Svenska Mejeriernas Riksforening, Sweden

[21] Appl. No.: 922,771

[22] Filed: Oct. 27, 1986

Related U.S. Application Data

[63] Continuation of Ser. No. 699,045, Feb. 7, 1985, abandoned.

[30] Foreign Application Priority Data

Mar. 9, 1984 [SE] Sweden ............................ 8401332-5

[51] Int. Cl.$^4$ .............................................. A23D 3/00
[52] U.S. Cl. ..................................... 426/603; 426/604; 426/613
[58] Field of Search ....................... 426/603, 604, 613

[56] References Cited

U.S. PATENT DOCUMENTS

| | | |
|---|---|---|
| 3,488,199 | 1/1970 | Gander et al. ............... 426/603 |
| 4,209,546 | 6/1980 | Johansson ................... 426/603 |
| 4,315,955 | 2/1982 | Cramer ...................... 426/604 X |
| 4,425,370 | 1/1984 | Graves ....................... 426/604 X |

FOREIGN PATENT DOCUMENTS

| | | |
|---|---|---|
| 622041 | 6/1961 | Canada ....................... 426/603 |
| 660651 | 5/1979 | U.S.S.R. ..................... 426/603 |

Primary Examiner—Raymond N. Jones
Assistant Examiner—C. Callahan

[57] ABSTRACT

A process for the manufacture of a butter like dairy spread which is spreadable at refrigeration temperature and which has a content of vegetable fat which is higher than 30% and which has a iodine value of between 55 and 65, whereby cream having an iodine value of 25–40 and an uncured vegetable fat are treated and churned. According to the invention a vegetable "cream" having substantially the same iodine value and other oleic acid composition as butter cream from milk is prepared in that a cured vegetable fat is emulsified with a milk product, is pasteurized, it may be acidified and temperature treated and is cooled to churning temperature, whereupon the vegetable "cream" together with the uncured vegetable fat and some amount of animal fat, for instance ordinary butter cream, is churned, and whereby the total amount of cured and uncured vegetable fat is between 30% and nearly 100% as calculated on the total fat content of the dairy spread.

10 Claims, 4 Drawing Sheets

PROCESS FOR THE MANUFACTURE OF A DAIRY SPREAD WHICH IS SPREADABLE AT REFRIGERATION TEMPERATURE

This is a continuation of co-pending application Ser. No. 699,045 filed on Feb. 7, 1985, now abandoned.

The present invention generally relates to a dairy spread which is spreadable at refrigeration temperature, and the invention is more particularly concerned with a process for the manufacture of such dairy spread having a fat content of about 80% and comprising a vegetable fat, possibly having an addition of butter fat, and having a final iodine value of 55–65 and in which process cream and uncured fat is supplied to a churner or a butter making machine and is churned at a temperature of 4°–10° C.

For a dairy spread to be acceptable on the market it is primarily necessary that the taste and aroma of the spread is acceptable, and in addition thereto there are strong demands for a good consistency, appearance and feeling at contact of the spread with the different parts of the mouth. The consistency is a complicated concept and is defined by factors like hardness, spreadability, viscosity, plasticity etc. The hardness is an important component for judging the spreadability of the dairy spread at different temperatures. For a good consistency and spreadability the butter ought to have a hardness of 2.0–2.5 kg/cm$^2$ at a temperature of about 14° C. (according to the method of Kruisheer - den Herders /K.DH./, Swedish Dairy Journal, No 1-1972, page 15). For being spreadable at refrigeration temperature of about 4°–8° C. the dairy spread ought to have a hardness value of between about 1.5 and 3.0 or preferably between 2.0 and 2.5 kg/cm$^2$.

Several types of dairy spreads are known which are spreadable at refrigeration temperature and which comprise fats mixed with some amount of an uncured oil for giving the spread the intended consistency at refrigeration temperature. Pure margarines are sometimes considered less acceptable, possibly since the consistency may be hard or short, brittle or lamelly and not so smooth and flexible as butter at a temperature of 14° C. or more. At contact with the palate, the tongue or other parts of the mouth margarine often gives a feeling of contact which is hard to define, but which does not appear in connection to butter and which may be referred to as a "margarine feeling".

Some spreads which are spreadable at refrigeration temperature are based on milk fats and give a more butter like spread. One example of a process for the manufacture of such a butter like dairy spread, which is spreadable at refrigeration temperature is given in the Swedish Patent No. 78 00900-8. According to the patent a refined vegetable oil is admixed in butter fat in an amount of 15–30 percent by weight as calculated on the entire fat amount of the dairy spread. It has not been considered possible to increase the addition of vegetable oil substantially over said 30% of the entire fat amount since this is thought to give a dairy spread having a hardness, a spreadability, a viscosity, a plasticity and other properties which differ too strikingly from the corresponding properties of butter and from the soft, smooth, slightly rolling consistency which is characteristic for good consistency of butter and the above mentioned butter like dairy spread. The supply of milk fat (butter fat) is strongly restricted in many parts of the world, and generally the milk fat is much more expensive than the vegetable, uncured oils which may come in question for the manufacture of a dairy spread, for instance soy oil, colza oil, sunflower oil and other oils.

As a consequence there has been a wish for a process for the manufacture of a butterlike spread which is spreadable at refrigeration temperature and which contains more than 30% and up to as close to 100% as possible of a vegetable oil as calculated on the total amount of fat.

So the invention relates to a process for the manufacture of a butter like dairy spread which is spreadable at a temperature of 4°–8° C. and which comprises a vegetable fat possibly having an addition of butter fat and having a final iodine value of 55–65. In said process a cream like product having an iodine value of about 28–38 and a liquid vegetable fat, for instance a uncured soy oil, colza oil, sunflower oil etc., preferably having a high amount of linolenic acid, is supplied to a butter making machine or a churner and is churned at a temperature of about 4°–10° C. which varies depending on the churning method.

According to the invention the cream is a so called vegetable "cream" which is prepared by bringing a vegetable fat having substantially the same iodine value and other oleic acid composition as butter cream or churn cream from milk to emulsify in a milk product like unsoured or . soured butter milk, skim milk, milk having about 4% fat or a milk-cream mixture having a low amount of fat, whereupon the emulsion of the milk product and the vegetable fat is acidified bacteriologically, and the vegetable "cream" is mixed with a given amount of uncured vegetable fat and possibly with ordinary sour butter cream and is supplied to a butter making machine or a churner in which the fat mixture is churned and worked to give the intended dairy spread.

Before the acidification the emulsion of the milk product and the liquid vegetable fat, that is the vegetable "cream", is subjected to a high pasteurization at over 85° C. and is then cooled to 6°–8° C. or lower temperature. Thereafter it may be subjected to a temperature treatment which is known per se, for instance according to the Alnarp method (the 8-19-16 method) or any analogous method. By such temperature treatment the consistency of the product is substantially improved. The method means that the fat emulsion is cooled to 8° C. or even a lower temperature immediately after the pasteurization, and it is kept at said temperature for 1–2 hours, whereupon the fat emulsion is cautiously heated to 19° C. and is kept at said temperature for about 2 hours, and then the fat emulsion is cooled to about 16° C.

After a bacteriological acidification and ripening to Ph 4.2–4.8 and an acidification degree of 90° Th the vegetable "cream" is cooled to churning temperature of 8°–10° C. in case of manufacture in a churner. In case of continuous manufacture it is cooled to 3°–4°C. and is stored for at least 3°–4 hours or preferably for 24 hours before the churning operation which takes place at a temperature of 5°–7° C. The vegetable "cream" may be intermediate-stored for 48°–72 hours.

The iodine value and the other oleic acid composition (solid fat) of, the vegetable "cream" is controlled by an addition of different mixtures of cured oils. The temperature treatment which provides a fractionated crystallization of the fat to a little number of large fat crystals gives the fat a smooth consistency. The temperature treatment of the vegetable "cream" is not absolutely necessary, but if the temperature treatment is excluded the vegetable "cream" preferably is given a slightly higher iodine value than the corresponding iodine value for manufacture of butter. The final iodine value of the vegetable "cream" is controlled so that the iodine value of the ready dairy spread is between 55 and 65. It also should be pointed out that some oils have such character that a temperature treatment of the vegetable "cream" ought to be avoided since the fat chrystals thereby may grow so large that the product gets a "sandy" character. Such an oil is cured soy oil. When using other oils like palm oil, colza oil or sunflower oil, on the contrary, the temperature treatment ought to be executed.

By the described process it is quite possible to make a butter like dairy spread which is spreadable at refrigeration temperature, which still has a very good consistency, which is made from cheap raw material and in which the amount of vegetable fat, as calculated on the total amount of fat is higher than 30 percent and may be as high as nearly 100 percent.

Figure 2:
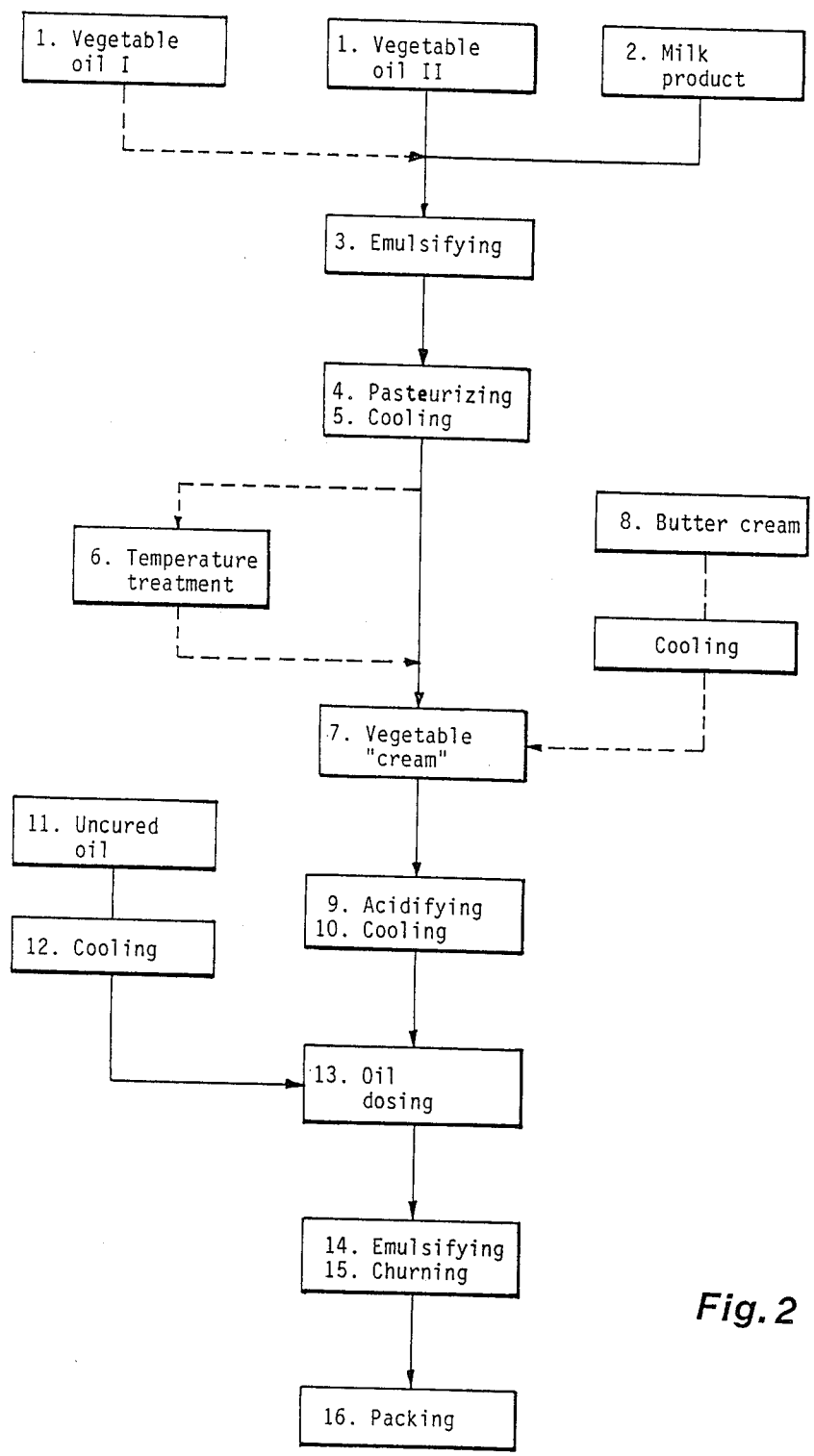
Figure 3:
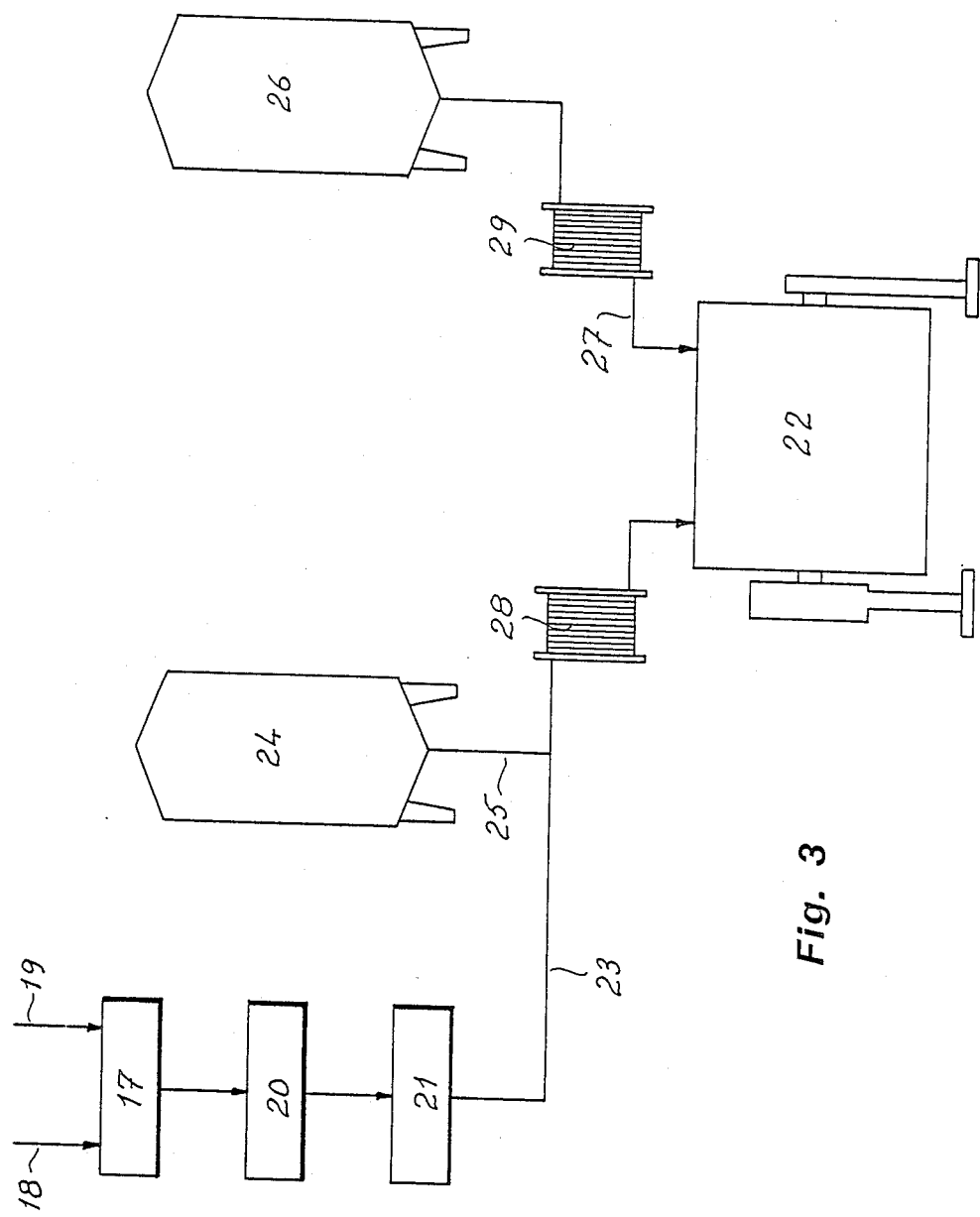
Figure 4:
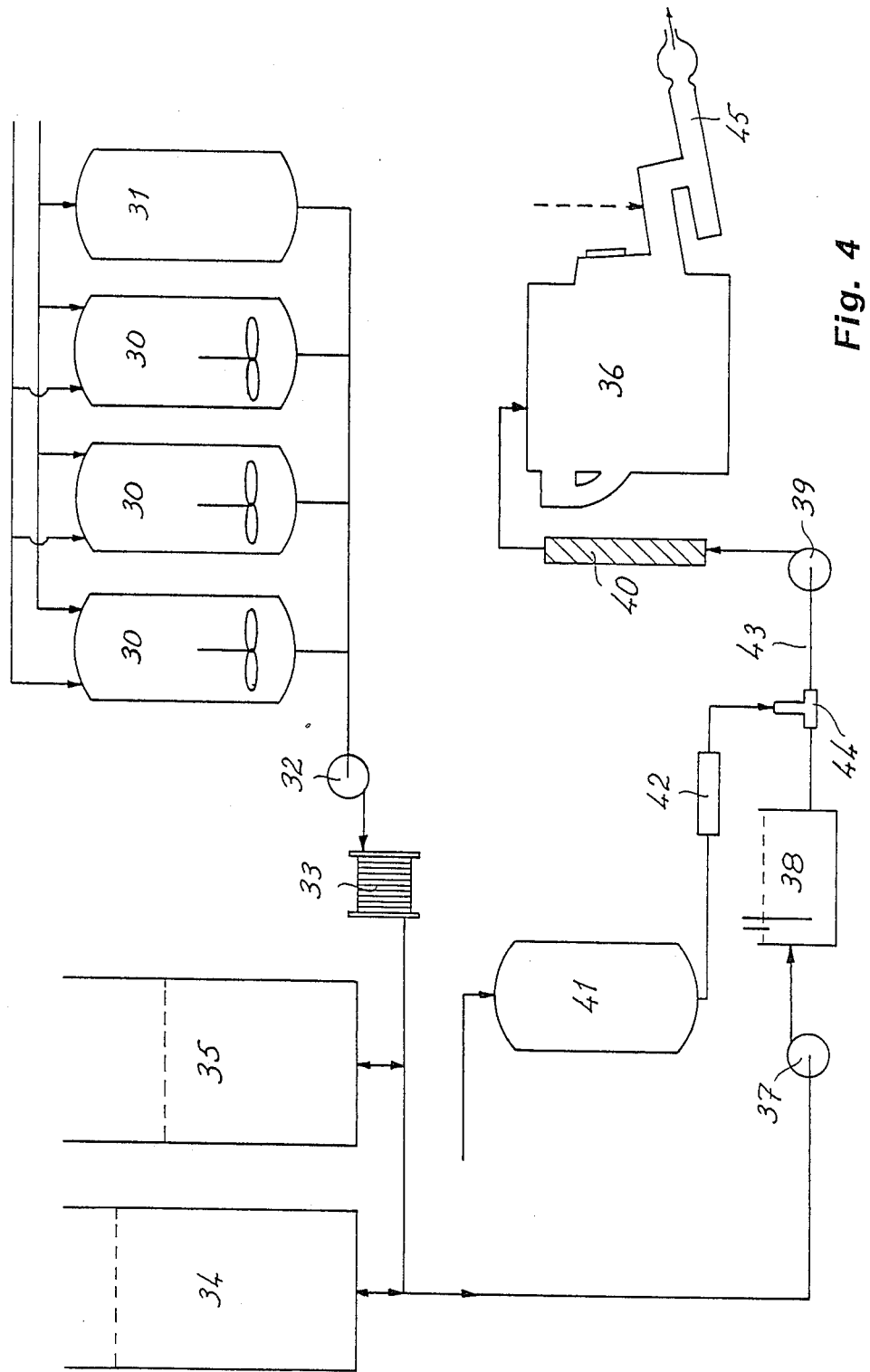

Now the invention is to be described more in detail in connection to the enclosed drawings. In the drawings FIG. 1 shows a diagram over the hardness index in relation to the temperature both for butter and for a dairy spread manufactured according to the invention;

FIG. 2 is a flow diagram illustrating the process according to the invention;

FIG. 3 diagrammatically illustrates a simple embodiment of an apparatus for batchwise manufacturing a dairy spread by the method according to the invention., FIG. 4 likewise diagrammatically shows an apparatus for continuous manufacture of a dairy spread according to the invention.

As mentioned FIG. 1 shows the hardness index both of butter and of a dairy spread manufactured according to the invention. By refrigeration temperature is meant a temperature of 4°-8° C. or preferably 5°-7°C. It is evident that butter within the interval 4°-8° C. has a hardness index of betveen about 12.5 and 7.5 kg/4cm$^2$ which is much higher than the intended hardness index of about 2.0-2.5 kg/4cm$^2$. By admixing some amount of a suitable uncured fat to the vegetable suitable uncured fat to "cream" before or in connection to the churning operation it is possible to control the hardness index so as to fall within the intended limits. Further, by subjecting the vegetable "cream" to a suitable temperature treatment the consistency may be further improved.

The process according to the invention is diagrammatically shown in the flow scheme of FIG. 2. A vegetable fat 1, for instance partly cured soy oil, colza oil or sunflower oil, preferably having a high content of linolenic acid and a milk product 2, e.g. unsoured butter milk, skim milk, ordinary milk having a standardized fat content or cream having a low fat content are emulsified 3, quick pasteurized 4 and cooled 5 to a temperature of about 6°-8° C. By the emulsification of the vegetable oil and the milk product a vegetable "cream" is formed which for improving the consistency of the final product when using certain oils may be subjected to a temperature treatment, for instance by the above mentioned Alnarp method (the 8-19-16 method. This means that the vegetable "cream" is cooled to 8° C. (or a lower temperature) immediately after the pasteurization and is kept at said temperature for 1-2 hours, whereupon the cream is cautiously heated to 19° C. and is kept at this temperature for about 2 hours, and that the cream is finally cooled to 16° C. The vegetable "cream" may be mixed with some amount of ordinary butter cream 8 which may have been temperature treated, whereupon the cream or cream mixture, if found suitable, may be acidified, preferably bacteriologically acidified. After the temperature treatment/acidification the cream or the cream mixture is cooled to a churning temperature of 4°-10° C. depending on the churning method.

Parallely to the preparation of the butter cream uncured fat 11 like soy oil, sunflower oil or colza oil is treated by being cooled 12. The cooled uncured oil is dosed into the vegetable "cream" or cream mixture 13 and the mixture of vegetable "cream" and uncured fat is emulsified at 14, whereupon the mixture is churned at 15 in conventional way, and after possible conventional salting, cooling, addition of aroma substances etc. it is packed at 16.

A simple equipment for batchwise manufacture of dairy spread by the method according to the invention is shown in FIG. 3. The equipment comprises a container 17 to which one or more vegetable fats 18 and a milk product 19 can be supplied. The container preferably is formed with means for providing an emulsification, acidification, cooling and other temperature treatments. From the emulsification apparatus the vegetable "cream" is transmitted to an intermediate storing tank 21 from which it is batchwise supplied to a churner 22 over a pipe 23. Parallelly to the supply of the vegetable "cream" to the churner some amount of ordinary butter cream, for instance cream having an iodine value of about 30, can be added from an intermediate storing container 24 over a pipe 25. In order to provide spreadability at refrigeration temperature the cured fat of the vegetable "cream" and possible butter cream has to be mixed with some amount of uncured fat, for instance soy oil. The uncured fat is supplied from a container 26 over a pipe 27. The cream or cream mixture is chilled in a cooler 28 before being added to the churner 22 and the uncured fat is chilled in a cooler 29. The temperature of the cream and the uncured fat when being supplied to the churner may be 5°-12° C. or preferably 8°-10° C. Cream and uncured fat is supplied to the churner 22 in such proportions that the uncured fat amounts about 20-30 percent of the total amount of fat. The amount of churn cream supplied from the container 24 can be varied from 0 percent and up depending on the available supply of butter cream. The vegetable fat 18 added to the container 17 together with the milk product 19 is controlled, like the type of uncured fat from the container 26, so that the iodine value of the ready dairy spread leaving the churner 22 is 55-65. The total amount of cured or partly cured and uncured vegetable fat of the prepared dairy spread may be as high as up to 100 percent of the fat amount, but for obtaining the best consistency, taste and aroma it has shown to be suitable to keep the amount of vegetable fat between 40 and 75 percent or preferably 55-65 percent. After the complete churning of the fat and cooling of the fat balls with water or cool butter milk the product may be supplied with salt and aroma substances. The products is finally kneaded and is taken out of the churner 22 and is packed.

FIG. 4 shows an equipment for continuous preparation of a dairy spread according to the invention. In this case the equipment comprises four process tanks of which for instance three tanks 30 are used for emulsifying, possibly acidifying and temperature treating one or more vegetable fats and a milk product, whereas the fourth tank 31 is a process tank for ordinary butter cream. Over a pump 32 and a cooler 33 the tanks 30 and 31 can be connected to any one of two intermediate storing tanks 34 and 35 from which the mixture of the vegetable "cream" prepared in the tanks 30 and butter cream from the tank 31, after having been cooled at 3°–4° C. for at least 3–4 hours or preferably for 24 hours, is supplied to a continuously operating butter making machine 36. The supply is made over a first pump 37 and a balance tank 38, a second pump 39 and a static mixer 40. For admixture of uncured vegetable fat there is a storing tank 41 which over a positive dosing pump 42 supplies the uncured vegetable fat (of +5° C.) directly to the vegetable "cream" or the cream mixture flowing in the pipe 43. The dosing is made by means of one or more injection nozzles 44. The vegetable "cream" or cream mixture and the uncured vegetable fat are well mixed in the static mixer 40. In the butter making machine 36 the dairy spread is continuously churned. After possible addition of further liquid fat, salt, aroma substances etc. the products is kneaded and is packed directly from the output channel 45. In a continuous manufaturing process the amount of uncured vegetable fat may be about 5% higher than in a batchwise manufacturing process, and thereby the total amount of vegetable fat is increased accordingly.

Now some examples of the described process will follow:

EXAMPLE 1

50/50% vegetable/animal fat

A butter like dairy spread which is spreadable at refrigeration temperature and having a fat content of 80% was prepared in an equipment for batchwise preparation of dairy spreads as follows.

In a plant for batchwise manufacture of a dairy spread which is spreadable at refrigeration temperature a vegetable "cream" was prepared in that 51 kg cured soy oil was heated to 50° C. and was mixed with 0.3 kg emulsifier of an ordinary monoglyceride type and 100 kg unsoured skim milk of 50° C. and having a fat content of 0.06% which was highpasteurized to 90° C. in a container, whereupon the mixture was emulsified by means of an emulsification pump. The vegetable "cream" thereby formed was cooled to 10° C. The fat content of the vegetable "cream" thereby formed was 33%.

Parallelly thereto both ordinary butter cream and uncured soy oil were prepared by a temperature treatment, and both were cooled to the same temperature as that of the vegetable "cream".

202 kg butter cream having a fat content of 37.5%, 152 kg of the prepared vegetable "cream" having a fat content of 33% and 25.8 kg uncured soy oil having a fat content of 100% were supplied to a butter churner. This means that the vegetable "cream" and the uncured soy oil amounted to 50% of the total fat content of the mixture whereas the remaining fat amount emanated from the butter cream. The three ingredients were mixed and churned whereby a dairy spread was obtained having a total fat content of 80%, 50% of which was vegetable fat. The salt content was 1.4%. The dairy spread had a iodine value of 55–65. The prepared dairy spread was cooled and packed at 10° C.

The dairy spread so made proved to be well spreadable at refrigeration temperature and to have a soft, smooth and butter like consistency.

EXAMPLE 2

50/50% vegetable/animal fat

The same process as in example 1 was repeated but with the difference that the vegetable "cream" in this case was prepared in that unacidified butter milk having a fat content of 2.5% was emulsified with the cured soy oil and 0.15% emulsifier of monoglyceride type. Otherwise the process of example 1 was followed.

The prepared dairy spread had a fat content of 80.2% and a iodine value of 64. The product was well spreadable at refrigeration temperature and had the same soft, smooth and butter like consistency as the product of example 1.

EXAMPLE 3

60/40% vegetable/animal fat

A vegetable "cream" was prepared in that an amount of coconut fat corresponding to 10% of the total fat content of the ready product and having a melting point of 25° C. and an amount of cured soy oil corresponding to 31% of the total fat content of the ready product and having a melting point of 33° C. were heated to 50° C. and thereafter cooled and temperature treated according to the "Alnarp method" (8–19–16 method) and was mixed with unsoured skim milk having a temperature of 50° C. and was emulsified over an emulsification pump and was cooled to 10° C. The vegetable "cream" had a fat content of 33%.

The vegetable "cream" was mixed and churned like in example 1 with an amount of uncured soy oil corresponding to 19% of the total fat content of the ready product and an amount of cream the butter fat content of which corresponded to 40% of the total fat content of the ready product. In this case the cream (the butter fat) was treated according to the Alnarp method (8-1-9-16 method). The fat content of the ready product was 78%, 60% of which was vegetable fat and 40% of which was the animal butter fat. The iodine value of the ready product was 57.6.

The dairy spread had a good spreadability at refrigeration temperature and had a soft, smooth and butter like consistency.

EXAMPLE 4

60/40% vegetable/animal fat

The process of example 3 was repeated but with the difference that the coconut fat and the cured soy oil were mixed and emulsified to a vegetable "cream" together with unsoured butter milk.

The fat content of the ready product was 80%, 60% of which was vegetable fat and 40% of which was animal fat. The iodine value of the ready product was 54.8.

The product proved to have the same good consistency and good judging as in example 3.

EXAMPLE 5

60/40 vegetable/animal fat

The process of example 4 was repeated but with the difference that the coconut fat and the cured soy oil for the preparation of the vegetable "cream" was substituted by an amount of palm oil corresponding to 41% of the total fat content of the ready product.

The product had a fat content of 80% and a iodine value of 55.6. The consistency of the product was not quite comparable to the consistency of the products made according to examples 1–4 and was judged less acceptable for commercial sale.

EXAMPLE 6

60/40% vegetable/animal fat

The process of example 3 was repeated but with the difference that the vegetable "cream" was prepared by mixing and emulsifying soured butter milk with palm oil, coconut oil and cured soy oil, whereby the amount of palm oil corresponded to 20% of the total fat content of the ready product, the coconut fat corresponded to 10% and the cured soy oil corresponded to 11%. Otherwise the process was the same as in example 3.

The product had a total fat content of 79% and a iodine value of 62. The consistency was not quite equal to that of example 3.

EXAMPLE 7

70/30% vegetable/animal fat

The same process as in example 1 was repeated but with the difference that the amount of cured soy oil for the preparation of the vegetable "cream" was increased to an amount corresponding to 46% of the total fat content of the ready product and that the amount of uncured soy oil was increased to 24% and the amount of butter fat was reduced to 30% of the total fat content of the ready product.

The product had a fat content of 81%, 70% of which was vegetable fat and 30% of which was animal fat, and it had an iodine value of 58. The product was smooth and soft at refrigeration temperature but had a slightly softer consistency than that of example 1. Still it was judged quite acceptable for commercial use.

EXAMPLE 8

70/30% vegetable/animal fat

The process of example 3 was repeated but with the difference that the amount of coconut fat and the amount of cured soy oil for the preparation of the vegetable "cream" was increased to an amount corresponding to 18% and 33% resp., that is 51% of the total fat content of the ready product, and that the amount of butter fat was reduced to 30%.

There were some problems in obtaining an emulsification to the vegetable "cream". The ready product had a fat content of 80% and an iodine value of 58. The product was judged equal to the product of example 7.

EXAMPLE 9

80/20% vegetable/animal fat

The process of example 7 was repeated but with the difference that the amount of uncured soy oil for being churned with the vegetable "cream" and the butter cream was increased to 34% and at the same time that the amount of butter fat was reduced to 20% of the total fat content.

The product was smooth and acceptable at refrigeration temperature but was too soft at room temperature.

EXAMPLE 10

80/20% vegetable/animal fat

The process of example 7 was repeated but with the difference that the amount of uncured soy oil for the preparation of the vegetable cream was increased to an amount corresponding to 56% and the amount of butter fat was reduced correspondingly to 20% of the total fat content.

The product had a good spreadability at refrigeration temperature and was smooth and soft but was judged softer and possibly slightly more tenacious in consistency than butter. At room temperature the product was acceptable with some hesitation, at least for use on sandwiches.

EXAMPLE 11

90/10% vegetable/animal fat

The process of example 9 was repeated but with the difference that the amount of cured soy oil for the preparation of the vegetable "cream" was increased to an amount corresponding to 56% of the total fat content of the product. In this case consequently only 10% butter fat was used when churning the vegetable "cream" with the soy oil and the butter fat.

Depending on the low amount of butter fat and the relatively high amount of uncured soy oil the product was too soft to be acceptable.

EXAMPLE 12

90/10% vegetable/animal fat

The process according to example 11 was repeated but with the difference that the content of cured soy oil for the preparation of the vegetable "cream" was increased to an amount corresponding to 66% of the total fat content of the product, and the content of uncured soy oil for the churning step was reduced correspondingly to 24%.

A slightly better product was obtained than that of example 11 but it was still judged too soft for commercial use.

EXAMPLE 13

90/10% vegetable/animal fat

The process of example 12 was repeated but with the difference that the content of soy oil for the preparation of the vegetable "cream" was increased to 76% of the total fat content of the ready product and that the content of uncured soy oil for the churning process was reduced correspondingly to 14%.

The ready product was smooth but still a little too soft but was still judged useful for some types of use of dairy spreads.

An additional number of tests were made with differing amounts and relationships of the vegetable and animal fat. The tests confirmed that it was very well possible to get a fully acceptable dairy margarine product having a substantially higher amount of vegetable fat than has so far been considered possible, and that for some purposes it was possible to reach a content of vegetable fat, as calculated on the total fat content of the product, of 90% and even still higher. This is possible since a vegetable "cream" according to the invention is prepared from a vegetable fat and a milk product, and that the vegetable "cream" is then eventually churned together with an animal fat, for instance ordinary butter cream, and an additional amount of uncured vegetable fat. It has been possible to maintain the iodine values for the dairy spread thus manufactured between 55 and 65. The tests also confirmed that it was possible in the manufacture of the vegetable "cream" to use different types of both soured and unsoured milk products and different types of uncured and cured vegetable fats. The consistency of the ready product can be improved if the fat of the vegetable "cream" is subjected to a temperature treatment, for instance a treatment according to the Alnarp method ("the 8-19-16 method") or an equivalent method.

We claim:

1. A process for the manufacture of a butter-like dairy spread which is spreadable at refrigeration temperatures and which contains a substantial vegetable fat content of at least 30% of the total fat content, said process comprising the steps of:
   (a) emulsifying vegetable oil and a milk product selected from the group consisting of unsoured butter milk, soured buttermilk, skim milk, low fat milk and low fat milk-cream mixture, thereby forming a vegetable cream,
   (b) pasteurizing the vegetable cream of step (a) at a temperature more that 85° C.,
   (c) cooling the vegetable cream of step (b) immediately after the pasteurizing step to a temperature of 8° C. or lower and holding said vegetable cream at this temperature for at least one hour,
   (d) subjecting the vegetable cream of step (c) to a temperature treatment as follows: slowly raising the temperature of the vegetable cream to about 20° C. and maintaining the 20° C. temperature for approximately two hours, and then cooling the vegetable cream slightly to approximately 16° C.,
   (e) bacteriologically acidifying and ripening the vegetable cream of step (d) to a pH of between 4.2 and 4.8,
   (f) parallelly preparing a product comprising a quantity of vegetable oil and at least some additional animal fat,
   (g) forming a mixture containing the vegetable cream of step (e) and a limited quantity of the product of step (f) and subsequently churning the mixture for a period of time sufficient to provide a spreadable mixture of substantial vegetable fat content and said spreadable mixture having substantially the same iodine value and oleic fatty acid level as butterfat.

2. The process according to claim 1 wherein the mixing step (g) is carried out at a temperature in the range of 5°-10° C.

3. The process according to claim 1 wherein the milk product utilized in preparation of the vegetable cream has a fat content of at least 4% by weight.

4. The process according to claim 1 wherein said vegetable cream comprises fat less than 40% by weight of the emulsion in step (d).

5. The process according to claim 1 wherein the vegetable oil is selected from the group consisting of palm oil, sunflower oil, soy oil or colza oil.

6. The process according to claim 4 wherein the vegetable cream is mixed with 10-50% by weight of butter cream "after the temperature treatment step (d) and prior to the acidifying step (e)."

7. The process according to claim 1 wherein the iodine value of the vegetable cream is controlled to a level of 55-65 by mixing in further quantities of vegetable oil.

8. The process according to claim 1 wherein the mixture of step (g) is kept at a temperature of 8°-10° C. prior to churing.

9. The process according to claim 4 wherein the mixture of step (g) is kept at a temperature of less than 5° C. for at least three hours prior to churning.

10. The process according to claim 1 wherein the mixture of step (g) is formed by injecting said product into said vegetable cream.

* * * * *